US011000892B2

(12) United States Patent
 Ziebart et al.

(10) Patent No.: US 11,000,892 B2
(45) Date of Patent: May 11, 2021

(54) NON-PATH-VARIABLE ELEMENT SWITCH AND METHOD FOR FEEDING CONNECTING ELEMENTS

(71) Applicant: BÖLLHOFF VERBINDUNGSTECHNIK GmbH, Bielefeld (DE)

(72) Inventors: Jan-Robert Ziebart, Werther (DE); Kilian Doedtmann, Bramsche (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 233 days.

(21) Appl. No.: 16/316,396

(22) PCT Filed: May 31, 2017

(86) PCT No.: PCT/EP2017/063117
§ 371 (c)(1),
(2) Date: Jan. 9, 2019

(87) PCT Pub. No.: WO2018/010888
PCT Pub. Date: Jan. 18, 2018

(65) Prior Publication Data
US 2020/0180012 A1   Jun. 11, 2020

(30) Foreign Application Priority Data

Jul. 12, 2016   (DE) .......................... 102016112732.9

(51) Int. Cl.
 *B21J 15/32*   (2006.01)
 *B21J 15/10*   (2006.01)
 (Continued)

(52) U.S. Cl.
 CPC ............. *B21J 15/32* (2013.01); *B23P 19/001* (2013.01); *B21J 15/025* (2013.01); *B21J 15/105* (2013.01); *B23P 19/062* (2013.01); *B65G 47/71* (2013.01)

(58) Field of Classification Search
 CPC ........ B21J 15/32; B21J 15/025; B21J 15/105; B23P 19/001; B23P 19/062; B65G 51/24; B65G 51/02; B65G 47/71
 See application file for complete search history.

(56) References Cited

U.S. PATENT DOCUMENTS 3,049,462 A * 8/1962 Barlow ............... B29C 66/8322
                                                      156/210
3,070,758 A * 12/1962 Janssen et al. ........... H03F 3/21
                                                      331/111
(Continued)

FOREIGN PATENT DOCUMENTS

CN   1304286 A    7/2001
CN   1320065 A   10/2001
(Continued)

OTHER PUBLICATIONS

Written Opinion & International Search Report for PCT/EP2017/063117 dated Oct. 10, 2017, 13 pages.
(Continued)

*Primary Examiner* — Bayan Salone
(74) *Attorney, Agent, or Firm* — Reising Ethington P.C.; Matthew J. Schmidt

(57) ABSTRACT

A non-path-variable element switch, in particular for connecting elements, which can be passed continuously by the elements being positive-lockingly guided, in particular head-guided, therein only in a feeding direction, from a plurality of profiled tracks into a number of profiled tracks, which is reduced compared to the plurality of profiled tracks. With the non-path-variable element switch, a plurality of (Continued)

Figure 1:
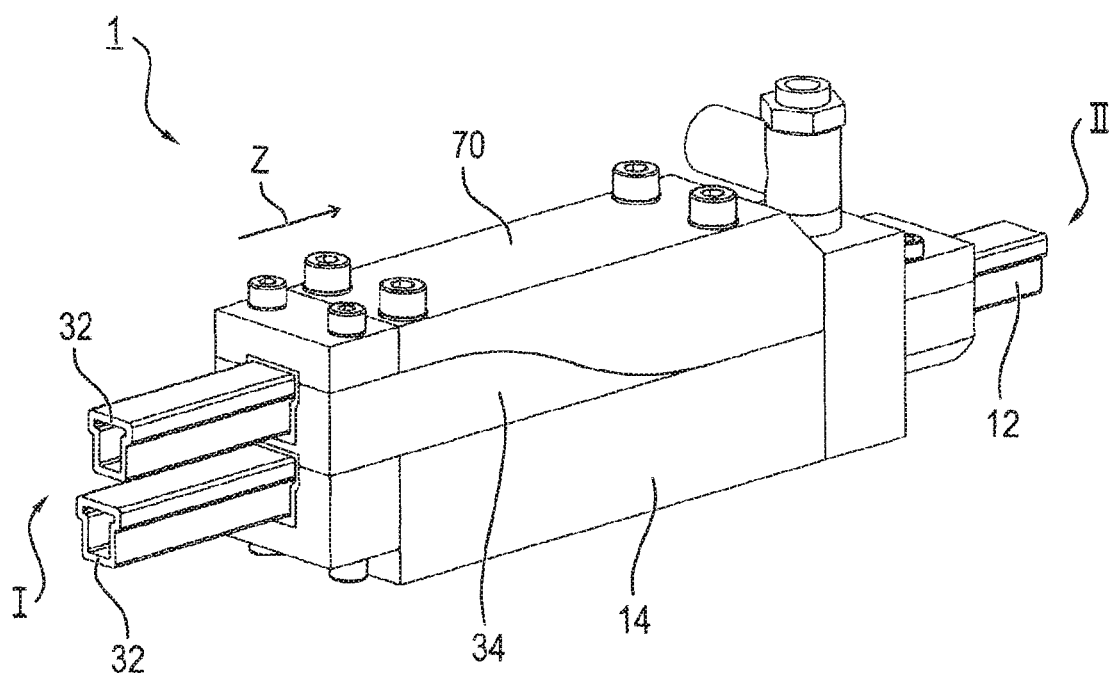

feeding sources with different elements are connected to a processing tool. Thereby, the element switch is characterized in that it comprises no mechanically switchable elements.

13 Claims, 13 Drawing Sheets

(51) Int. Cl.
  *B21J 15/02* (2006.01)
  *B23P 19/00* (2006.01)
  *B23P 19/06* (2006.01)
  *B65G 47/71* (2006.01)

(56) References Cited

U.S. PATENT DOCUMENTS

| | | | | |
|---|---|---|---|---|
| 3,823,803 | A * | 7/1974 | Lubin | B65G 11/203 |
| | | | | 193/46 |
| 6,015,686 | A * | 1/2000 | Dubensky, Jr. | C07K 14/005 |
| | | | | 435/69.1 |
| 6,070,758 | A | 6/2000 | Graham | |
| 6,601,365 | B2 | 8/2003 | Arishiro et al. | |
| 6,692,213 | B1 * | 2/2004 | Butler | B21J 15/025 |
| | | | | 414/412 |
| 6,944,944 | B1 * | 9/2005 | Craythorn | B21J 15/025 |
| | | | | 29/798 |
| 7,487,583 | B2 * | 2/2009 | Craythorn | B21J 15/025 |
| | | | | 29/809 |
| 7,849,579 | B2 * | 12/2010 | Craythorn | B21J 15/32 |
| | | | | 29/524.1 |
| 8,015,686 | B2 | 9/2011 | Hain et al. | |
| 8,690,037 | B2 * | 4/2014 | Wenzel | B23P 19/006 |
| | | | | 227/120 |
| 8,850,685 | B2 * | 10/2014 | Craythorn | B21J 15/32 |
| | | | | 29/524.1 |
| 8,973,247 | B2 * | 3/2015 | Hain | B21J 15/32 |
| | | | | 29/525.06 |
| 9,051,133 | B2 * | 6/2015 | Kremser | B65G 51/02 |
| 9,352,383 | B2 * | 5/2016 | Craythorn | B21J 15/32 |
| 9,776,239 | B2 * | 10/2017 | Craythorn | B21J 15/025 |
| 10,099,273 | B2 | 10/2018 | Craythorn et al. | |
| 2015/0174711 | A1 | 6/2015 | Hain et al. | |

FOREIGN PATENT DOCUMENTS

| | | | |
|---|---|---|---|
| CN | 101279443 A | 10/2008 | |
| CN | 201990258 U | 9/2011 | |
| CN | 104309981 A | 1/2015 | |
| DE | 102005041534 A1 | 3/2007 | |
| DE | 102008051489 A1 | 4/2010 | |
| DE | 102009030103 A1 | 12/2010 | |
| DE | 102012212502 A1 | 10/2013 | |
| EP | 0618022 A1 | 10/1994 | |
| FR | 2625696 A1 | 7/1989 | |
| GB | 954522 A * | 4/1964 | B21J 15/32 |
| GB | 954522 A | 4/1964 | |
| JP | S584523 U | 1/1983 | |
| JP | 2002522224 A | 7/2002 | |
| JP | 2002239678 A | 8/2002 | |
| KR | 20-1993-0010598 U | 6/1993 | |
| WO | WO0007751 A1 | 2/2000 | |

OTHER PUBLICATIONS

KR Office Action for KR Application No. 10-2019-7002628 dated Mar. 31, 2020 (6 pages).

English translation of the International Preliminary Report on Patentability for PCT/EP2017/063117 dated Jan. 15, 2019, (8 pages).

CN Office Action for CN Application No. 201780043486.9 dated Oct. 31, 2019 (8 pages).

CN Office Action for CN Application No. 201780043486.9 dated May 22, 2020 (6 pages).

JP Office Action for JP Application No. 2019-500651 dated Mar. 10, 2020 (6 pages).

* cited by examiner

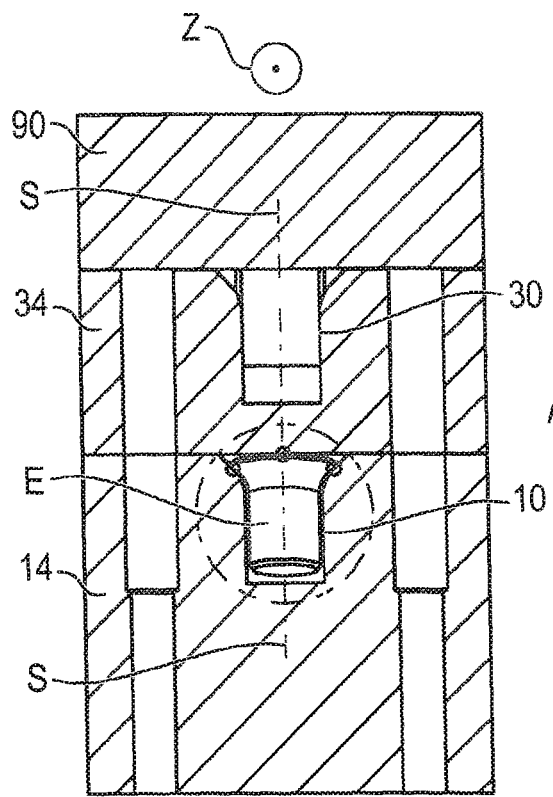 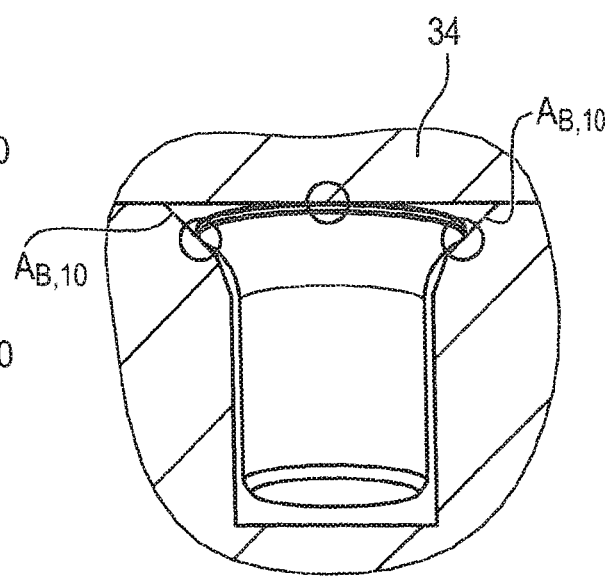
FIG. 9a　　　　　　FIG. 9b
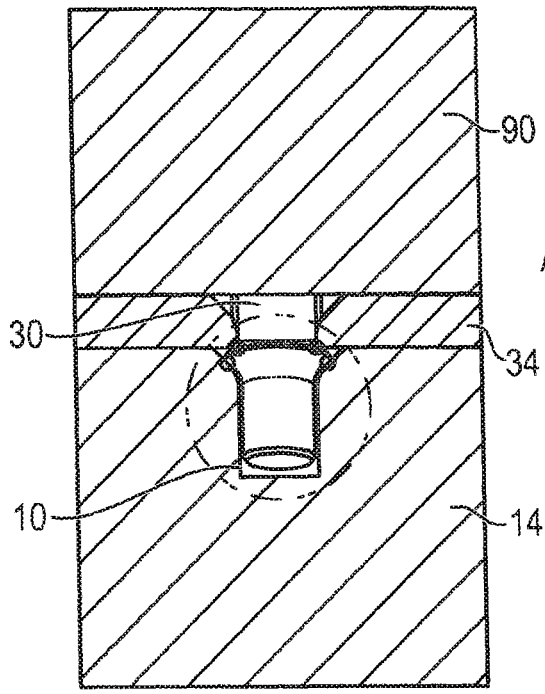 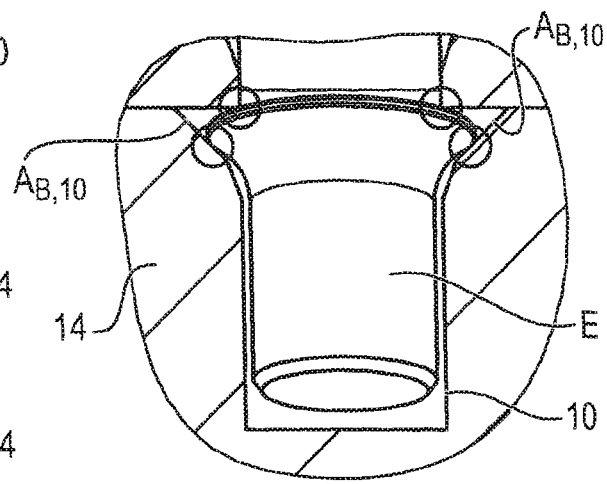
FIG. 10a　　　　　　FIG. 10b

NON-PATH-VARIABLE ELEMENT SWITCH AND METHOD FOR FEEDING CONNECTING ELEMENTS

1. TECHNICAL FIELD

The present disclosure relates to a non-path-variable element switch, in particular for connecting elements, a feeding method for head-guided connecting elements and a manufacturing method for the non-path-variable element switch.

2. BACKGROUND

In practice, different joining tasks can be solved with the use of just one joining device, for example a setting tool for self-piercing rivets. Accordingly, differently configured self-piercing rivets, such as self-piercing rivets made of different materials or with different lengths, must be fed specifically to the setting tool. As soon as the corresponding connecting element is present in the setting tool, the setting tool can approach the corresponding joining spot and establish the connection there. In order to solve this task, the joining devices are often connected with complex magazining devices. These magazines then contain different configurations of connecting elements that can be selectively fed to the setting tool using complex switching technology.

DE 10 2005 041 534 A1 describes a basic configuration for storing two different connecting elements in a setting tool. Here, it is proposed to provide a storage chamber in the manner of a shift register in which a connecting element can be stored temporarily. Since this connecting element is then no longer in the feeding channel for another connecting element, it is possible to set two different connecting elements consecutively in a relatively short time interval. This temporary storage thus eliminates longer feeding times for a connecting element, which is caused, for example, due to the length of the feeding tube between the setting tool and the reservoir of the connecting elements.

While FR 2 625 696 describes a combination of several magazines connected to a feed port, EP 0 618 022 A1 describes a buffer magazine for a variety of different rivet configurations. This buffer magazine provides a storage pipe for any rivet configuration. In this pipe, the respectively desired self-piercing rivets or other connecting elements are temporarily stored in a position-oriented manner and adapted to the upcoming joining process. Once a certain filling level of the buffer magazine is deceeded, the buffer magazine is refilled parallel to the further supply of the joining device. Such an arrangement ensures not only a high variability of the available connecting elements but also a high capacity of joining elements for the completion of a large number of joining processes. Regardless of these advantages, the construction and space requirements of the buffer magazine described here are relatively complex. This is because the individual parallel pipes that are available for the storage of different joining elements have to be automatically accessible or approachable individually. Only such an automatic selection of the respective storage for the correct joining element ensures that also the suitable joining element is delivered to the setting tool. Thus, the construction described here not only requires a certain amount of space but also the appropriate maintenance in order to ensure uninterrupted operation of the buffer magazine as far as is possible.

DE 10 2009 030 103 A1 describes a solution that is simpler in terms of switching technology and construction. Here, it is proposed to connect a setting tool with several feeding tubes for different connecting elements. These feeding tubes end in the immediate proximity of the setting tool, for example at the C-frame. Since all feeding tubes can be connected with the element switch to the setting tool, selectively controllable actuators move the respectively desired connecting element into the feeding channel to the setting tool. Due to this individual control of the riveting sources used here it is ensured that there are not several connecting elements provided at the same time in the feeding channel for the setting tool. However, the switching technology used here also requires a certain amount of maintenance. In addition, its weight must be taken into account, since due to the arrangement of the element switch used here, the former is constantly moved to the joining spots by the robot together with the setting tool.

It is therefore an object of at least some embodiments of the present invention to provide a simple, robust and switch-technically less sensitive element switch, which allows the selective feeding of individual different connecting elements to a connecting device, for example a setting tool.

3. SUMMARY

The above may be achieved by a non-path-variable element switch, by a feeding method for positive-lockingly or form-fittingly guided connecting elements, by a manufacturing method for the non-path-variable element switch and by a processing tool in connection with feeding sources and the non-path-variable element switch as set forth in this disclosure. Further designs and further developments are set forth in the following description, the accompanying drawings and the claims.

The present disclosure is directed to a non-path-variable element switch, in particular for connecting elements. The element switch can be passed continuously by the elements being positive-lockingly guided, in particular head-guided, therein only in a feeding direction, from a plurality of profiled tracks into a number of profiled tracks which is reduced compared to the plurality of profiled tracks. For this purpose, the element switch establishes a fixed connection between a main profiled track and at least one first profiled track. In addition, the elements to be transported in a profiled track and in the element switch are guided in a position-oriented manner by positive locking between element and profiled track and thus between element and element switch.

The non-path-variable element switch provides the possibility, to feed different types of joining elements in a position-oriented manner, for example to a setting tool. For this, the element switch does not require any switching technology for changing the path of the joining elements within the switch. Instead, the paths to be passed by the elements within the element switch are defined in a fixed or stationary manner. Due to its structure, the non-path-variable element switch allows the connection of at least two profiled tracks. Within the element switch, a main profiled track may be connected to at least one further profiled track, so that the feeding of the elements takes place only via the main profiled track to the setting tool. Of course, instead of a setting tool, other element processing tools are also considerable, to which elements must be fed in a position-oriented manner. Thereby the profiled tracks, in the same way as the main profiled track, provide the possibility that due to the positive locking of the elements within the main profiled track and the profiled track, the elements arrive at the processing tool in a position-oriented manner. The element switch may be of modular construction, which means that several profiled tracks can be connected to the main profiled track. In this way it is possible to feed the main profiled track with any number of feeding sources with differently configured elements via one profiled track respectively. The element switch with its modular construction makes it possible for the most different elements to enter the main profiled track and to be transported to the setting tool by means of this main profiled track. If a clocked feeding of the elements is realized via the profiled tracks, an element of a desired configuration can also be fed selectively to the processing tool or setting tool.

According to a further embodiment of the element switch, the main profiled track comprises a T-shaped cross-section with a head side and a shaft side and the at least one first profiled track opens in a connecting portion on the head side or shaft side into the main profiled track.

In order to realize a connection between the main profiled track and the at least one profiled track for the supply of differently configured elements, a connecting portion is provided in the element switch. Due to the profiled tracks used, the elements moved therein have a specific position orientation. Therefore it is necessary that at the feeding of a further element to the main profiled track via a further profiled track, it is ensured that the element exiting the profiled track has the same orientation compared to the main profiled track. Since, the cross-section of the main profiled track is formed T-shaped, the elements are fed to the main profiled track in approximately parallel orientation. Accordingly, the profiled track is connected to the main profiled track either at the head side of the T-cross-section or at the bottom side of the T-cross-section. The T-cross-section ensures that the head-guided connecting elements can be fed via the element switch. In this case, the cross bar of the T-cross-section corresponds to the head portion, while a shaft of an element can be guided in the perpendicular section of the T-cross-section.

In comparison and as an alternative to the above-described T-shaped cross-section of the main profiled track and the profiled track, the cross-section of these tracks can also be defined more generally. Accordingly, the cross-section could then be adapted to an even wider variety of connecting elements and elements that can be fed at all. For this purpose, the main profiled track and the at least one profiled track may each have a cross-section which comprises at least one first portion which is mirror-symmetrical to a line perpendicular to the feeding direction as an axis of symmetry and which is greater in width than in height, wherein a height can be determined parallel to the axis of symmetry.

Such a cross-sectional design of the main profiled track and the at least one profiled track makes it possible to transport nuts, washers, ring elements or the like by means of the element switch and an adapted cross-section of the profiled tracks. In this context, it may be preferred that the main profiled track and the at least one profiled track have a greater width than height in the respective cross-section. In a gravity analysis, such a cross-sectional form means that the elements are transported transversely in the feeding direction and are of greater width than height in their cross-section.

According to another embodiment, the cross-section of the at least one profiled track and of the main profiled track comprises at least a second portion which is mirror-symmetrical to the line perpendicular to the feeding direction as an axis of symmetry and which has a smaller width than the first width.

By defining this additional second portion, a general definition, e.g. of the T-shaped cross-section (see above), is possible. In addition, with the definition of the first and second portion, further cross-section geometries of elements and thus of the transporting main profiled track and the plurality of profiled tracks is possible, which have a different shape than the T-shape.

It may be further preferred that the at least one first profiled track enters in the connecting portion into the main profiled track, wherein the axes of symmetry of the cross-sections of the at least one first profiled track and of the main profiled track are aligned approximately collinear with one another. The embodiment described here defines a further criterion for aligning the cross-sections of the at least one profiled track with the cross-section of the main profiled track. The specific cross-section orientation and the mutual cross-section adaption are necessary so that transported elements can be transferred from the profiled track to the main profiled track at all. If rotationally symmetrical elements, e.g. self-piercing rivets, screws, nails, bolts, are transported head-guided in the at least one profiled track, then a collinear alignment of the axes of symmetry of the profiled track and the main profiled track with each other is sufficient. However, if the cross-sections of the at least one profiled track and the main profiled track are adapted to elements which, for example, cannot be rotated about their longitudinal axis within the profiled tracks, an additional geometry or alignment criterion is defined. In this case it may be preferred that the cross-section and the at least one profiled track itself as well as the main profiled track are characterized by symmetry planes. If elements such as a screw with hexagonal head or a hexagonal nut are guided therein, then, the symmetry planes of the profiled track and the main profiled track may be aligned with each other in a coplanar manner. In this case it can be ensured that the elements can be transferred smoothly from the at least one profiled track to the main profiled track.

According to a further embodiment, the at least one first profiled track is also T-shaped in cross-section. In addition, it may comprise a head portion and a shaft portion and the profiled track enters in the connecting portion of the element switch with the shaft portion into the main profiled track on the head side.

The configuration just defined refers to the fact that the elements fed from the profiled track to the main profiled track must have the same spatial orientation as the elements guided in the main profiled track. In order to ensure this position orientation and also to avoid jamming of the fed elements within the element switch, the profiled tracks are connected within the connecting portion on the head or shaft side with the main profiled track.

In addition, it may be preferred that the head portion of the at least one first profiled track provides a head bearing being lateral in relation to the feeding direction for an element to be transported, which is set back laterally in the connecting portion of the element switch.

In the connecting portion of the element switch, the profiled track transitions at the head side into the main profiled track. In order to ensure here a smooth transition of the elements from the profiled track to the main profiled track, a head guide provided by the profiled track is reduced with the aid of the lateral head bearing in the connecting portion of the element switch and is then completely eliminated or terminated. With the aid of this transition, the head guide is transferred from the profiled track to the main profiled track without a moving element being stopped or obstructed in its feeding movement. In addition, the transfer from the lateral head bearing of the profiled track to the lateral head bearing of the main profiled track ensures that the position orientation of the moving element within the element switch is maintained.

Furthermore, it may be preferred that the at least one first profiled track is formed T-shaped in cross-section and comprises a head portion and a shaft portion. In addition, the profiled track may enter in the connecting portion with the head portion into the main profiled track on the shaft side.

In analogy to the embodiment described above, here, the profiled track is connected to the main profiled track from the direction of the extended perpendicular section of the T-cross-section of the main profiled track. In this case, the element guided in the profiled track enters the main profiled track on the shaft side and via the shaft portion of the T-shaped cross-section of the main profiled track. To prevent the element guided in the profiled track from colliding with the lateral head guiding of the main profiled track, it may be preferred that the positive locking or head guiding of the main profiled track ends within the connecting portion to the profiled track. In particular, the main profiled track may provide on the head side a head bearing lateral in relation to the feeding direction. This lateral head bearing is set back laterally for at least a track section in the connecting portion when the profiled track opens on the shaft side into the main profiled track.

According to another embodiment of the element switch, the main profiled track and the at least one first profiled track are formed closed adjacent to a head portion. The head portion is open only in a connecting portion between the main profiled track and the profiled track.

The head guiding of the elements within the element switch is substantially achieved by the effect of gravity. While gravity presses the element into the profiled track, the positive locking ensures that the head of the element is supported by the profiled track and that the element does not fall through the profiled track. If, for example, the effect of gravity is switched off, for example by an overhead operation, there is the disadvantage that the elements could fall out of the main profiled track or the profiled track. Therefore, the head portions of the profiled track and the main profiled track are closed. In accordance with various embodiments of the present invention, a cover in the head portion is provided for this closure. In the same way, it is also possible to close the head portion of the main profiled track with a further profiled track arranged thereover. In the same way, a main profiled track could close a profiled track arranged underneath.

It may be that the element switch is connected to a source of compressed air, so that elements can be moved through the element switch by means of compressed air. According to another embodiment of the element switch, the latter represents a stacked construction consisting of one main profiled track and several profiled tracks.

The present disclosure further includes a feeding method for a positive-lockingly guided connecting element, in particular a head-guided connecting element, which comprises the following steps: providing a plurality of different connecting elements which can each be fed via a main profiled track to a connecting tool, in particular a setting tool, connecting the plurality of profiled tracks to a non-path-variable element switch, so that the plurality of different connecting elements are brought together in the main profiled track, and clocked feeding of the different connecting elements via the non-path-variable element switch to the connecting tool in such a way that at least one connecting element gets on the head side or shaft side into the main profiled track via a profiled track on the head side.

The present disclosure further comprises a manufacturing method for a non-path-variable element switch comprising the following steps: providing a main profiled track in which an element can be positive-lockingly guided, and may be head-guided, providing at least one profiled track in which the element can be positive-lockingly guided, such as head-guided, firmly connecting the main profiled track to the at least one profiled track in a connecting portion such that the profiled track enters the main profiled track in the element switch in a feeding direction of the element, wherein the main profiled track and the at least one profiled track each have a cross-section which comprises at least a first portion, which is mirror-symmetrical to a line perpendicular to the feeding direction as an axis of symmetry and which is of greater width than height, wherein a height can be determined parallel to the axis of symmetry and the main profiled track and the at least one profiled track are connected to each other on a side perpendicular to the axis of symmetry, or firmly connecting the main profiled track to the at least one profiled track in a connecting portion, wherein the main profiled track comprises a T-shaped cross-section with a head side and a shaft side and the at least one profiled track opens into the main profiled track on the head side or shaft side.

As part of the manufacturing method, it may be further preferred that a lateral head bearing of the main profiled track which is present with respect to a feeding direction is set back laterally when a profiled track is connected to the main profiled track on the shaft side. Analogously, it may be preferred that a lateral head bearing of the profiled track which is present with respect to a feeding direction is set back laterally when the profiled track is connected to the main profiled track on the head side. With the aid of the manufacturing method described here, it is possible to implement the constructional features of the element switch already characterized above.

The present disclosure further comprises a processing tool for elements, in particular a setting tool, in connection with a plurality of feeding sources for different elements, which may be connecting elements, wherein the elements of the feeding sources can be fed to the processing tool via at least one profiled track and a main profiled track by means of a non-path-variable element switch in accordance with one of the above-described embodiments.

4. BRIEF DESCRIPTION OF THE ACCOMPANYING DRAWINGS

Figure 2:
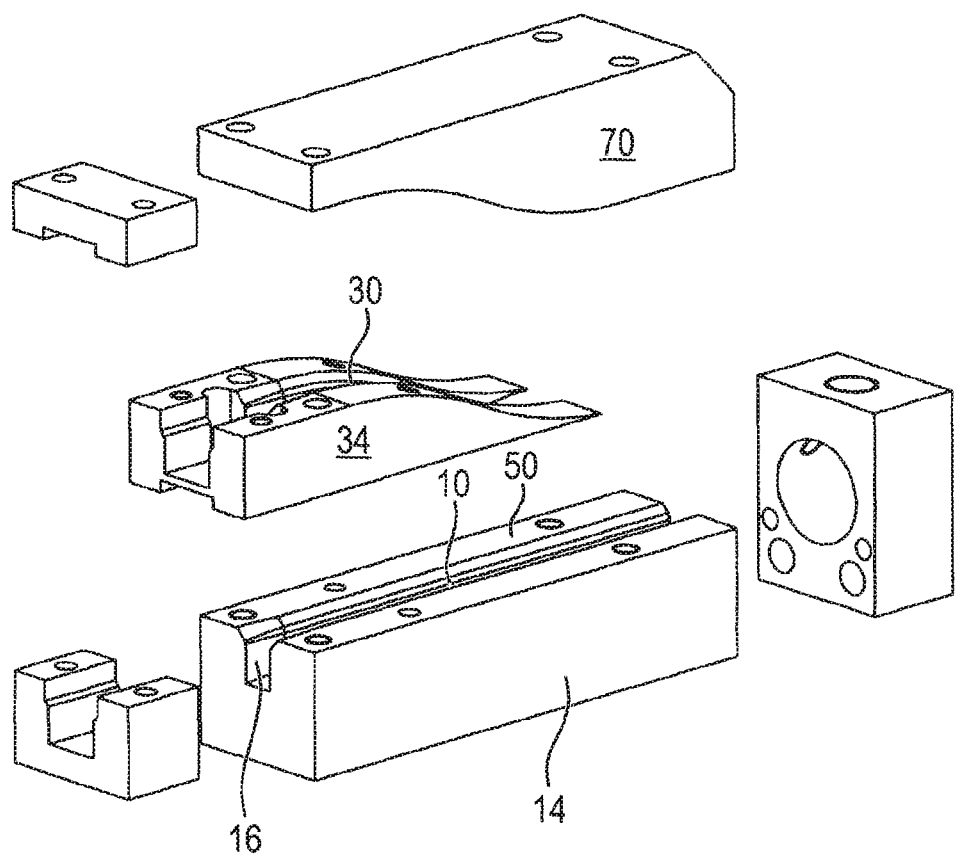
Figure 3A:
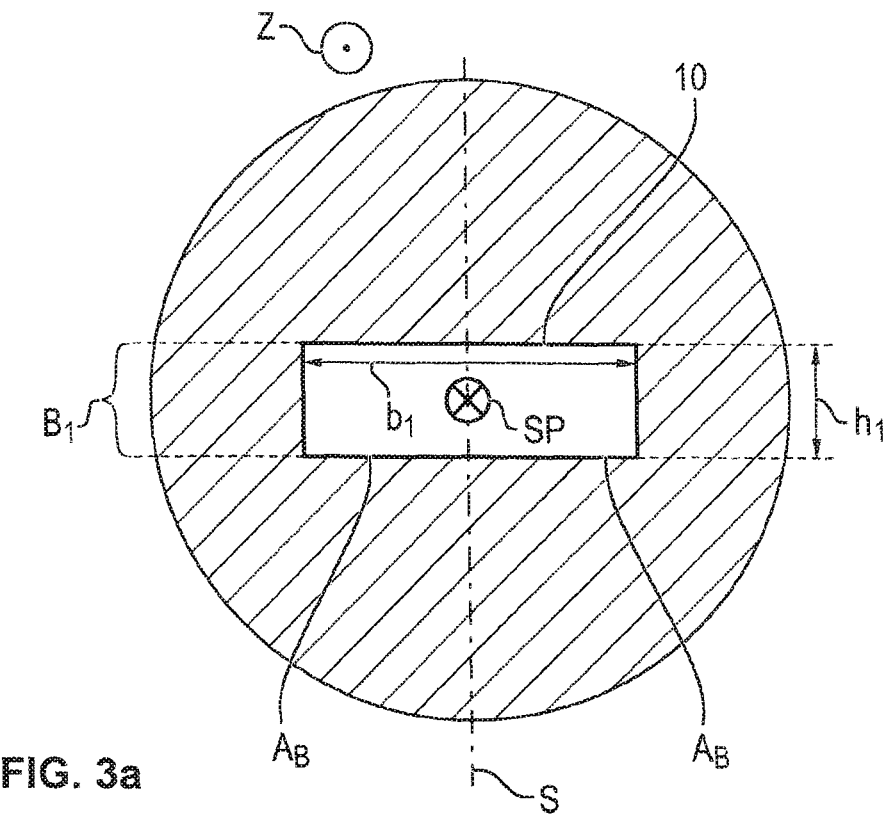
Figure 3B:
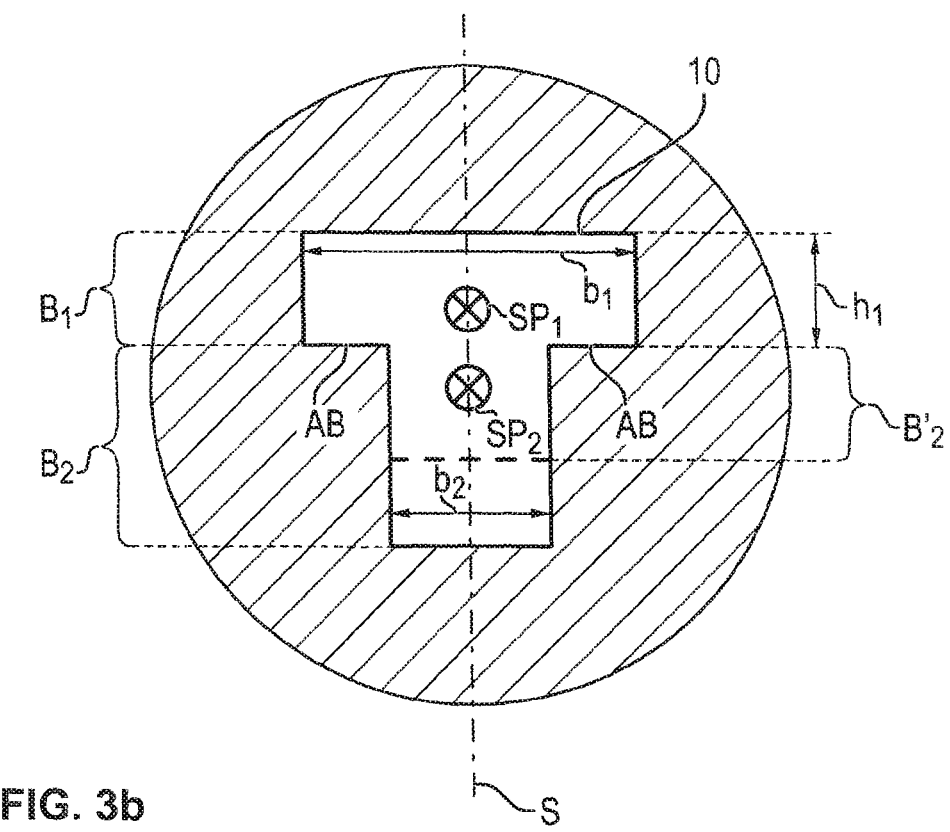
Figure 4:
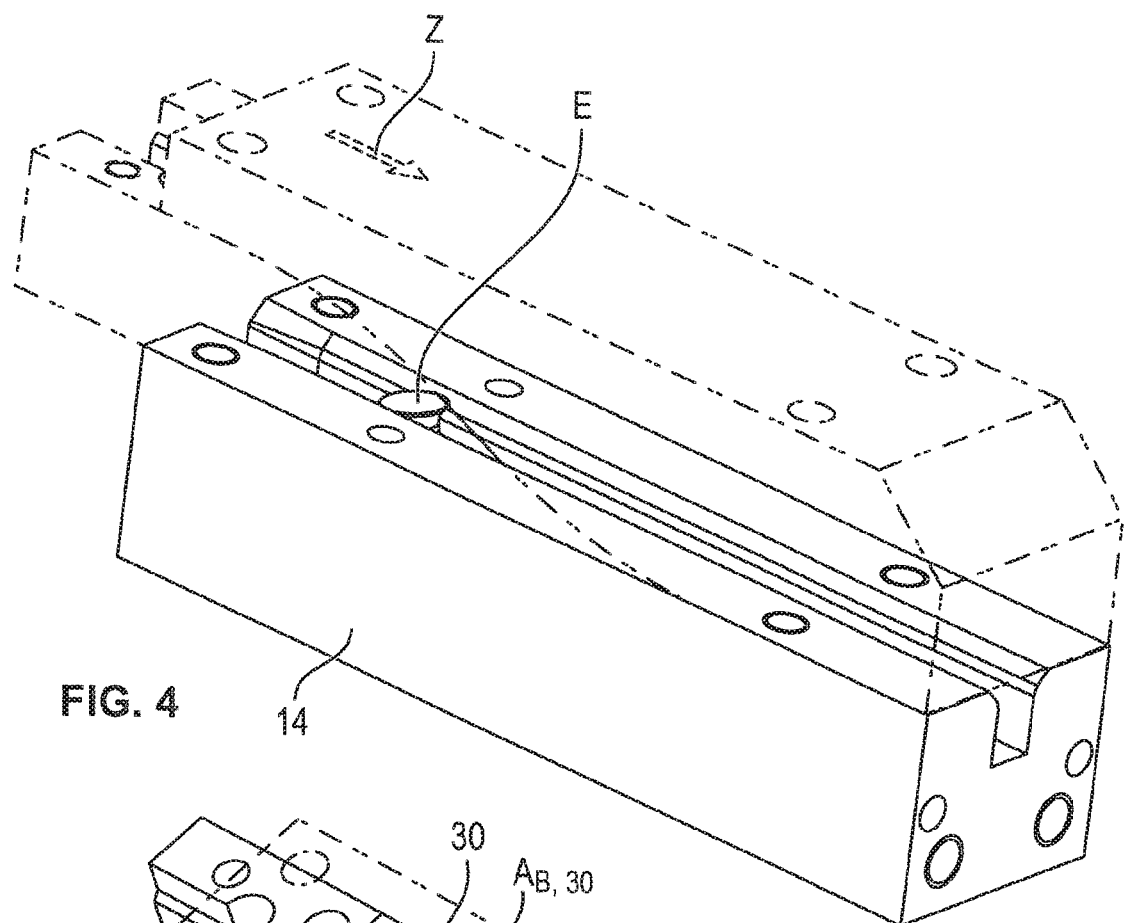
Figure 5:
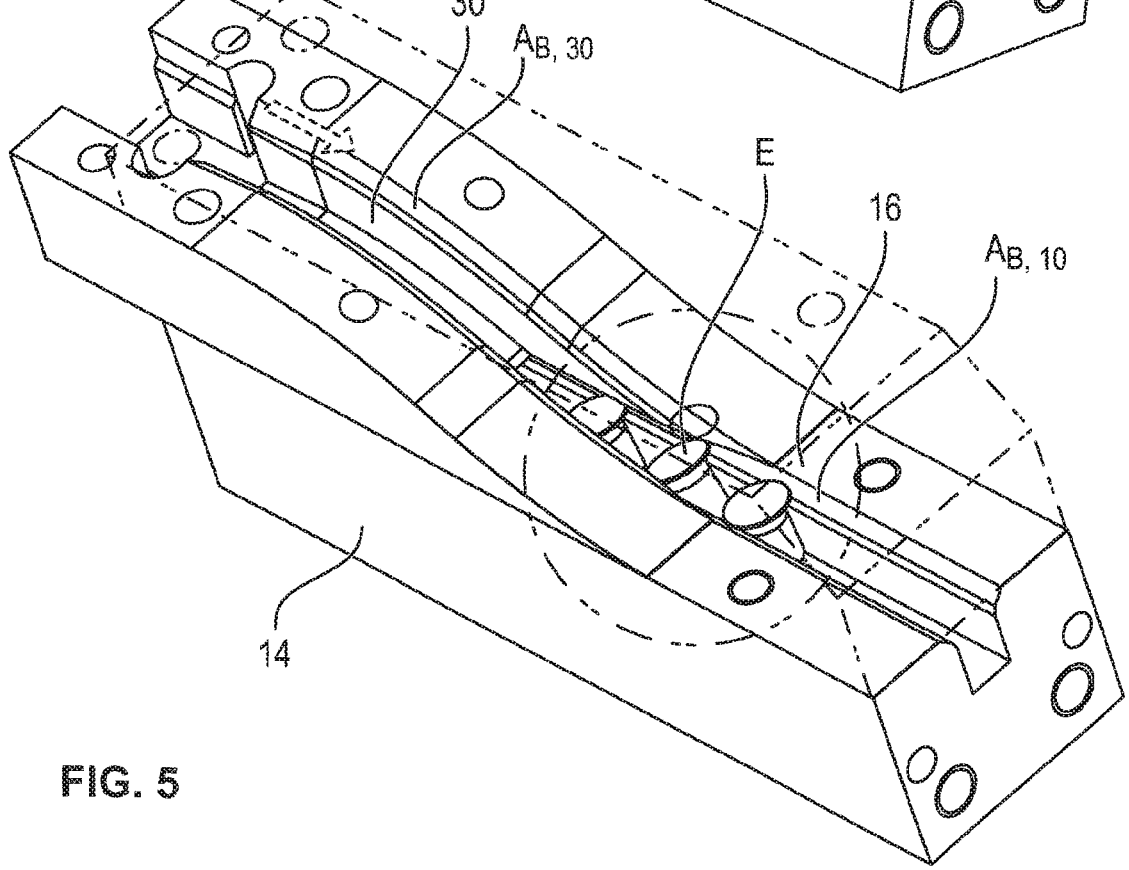
Figure 6:
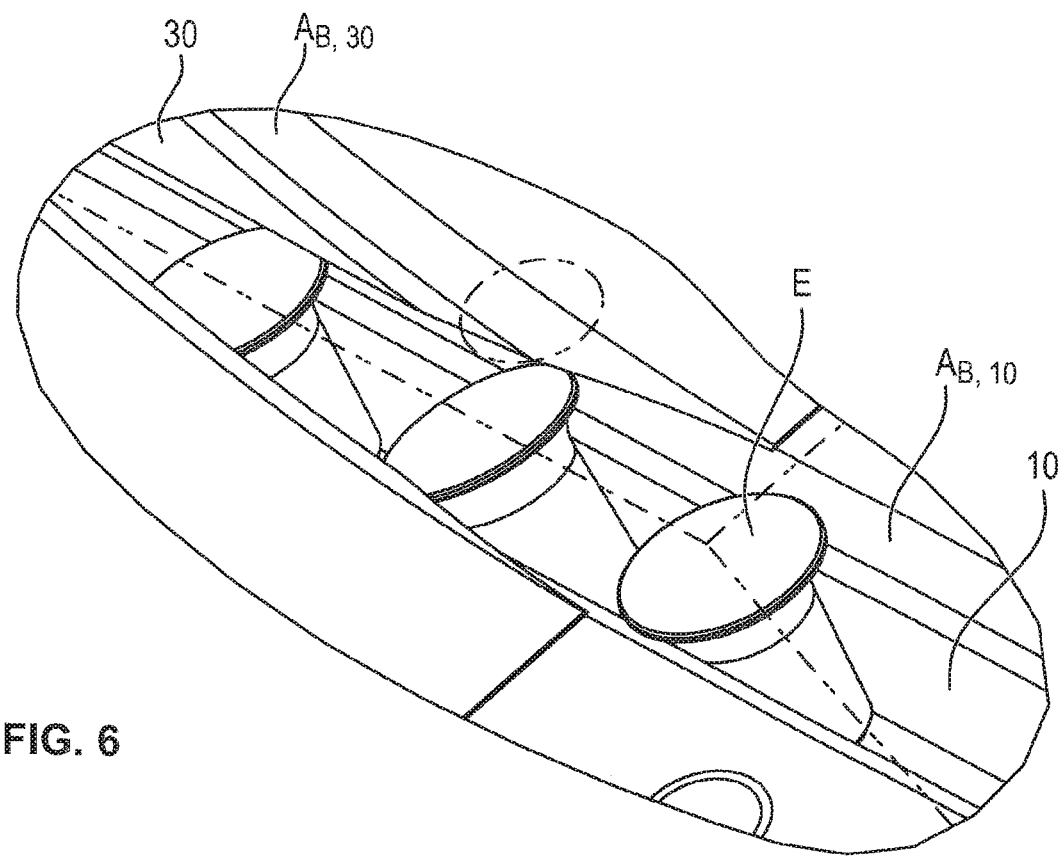
Figure 7:
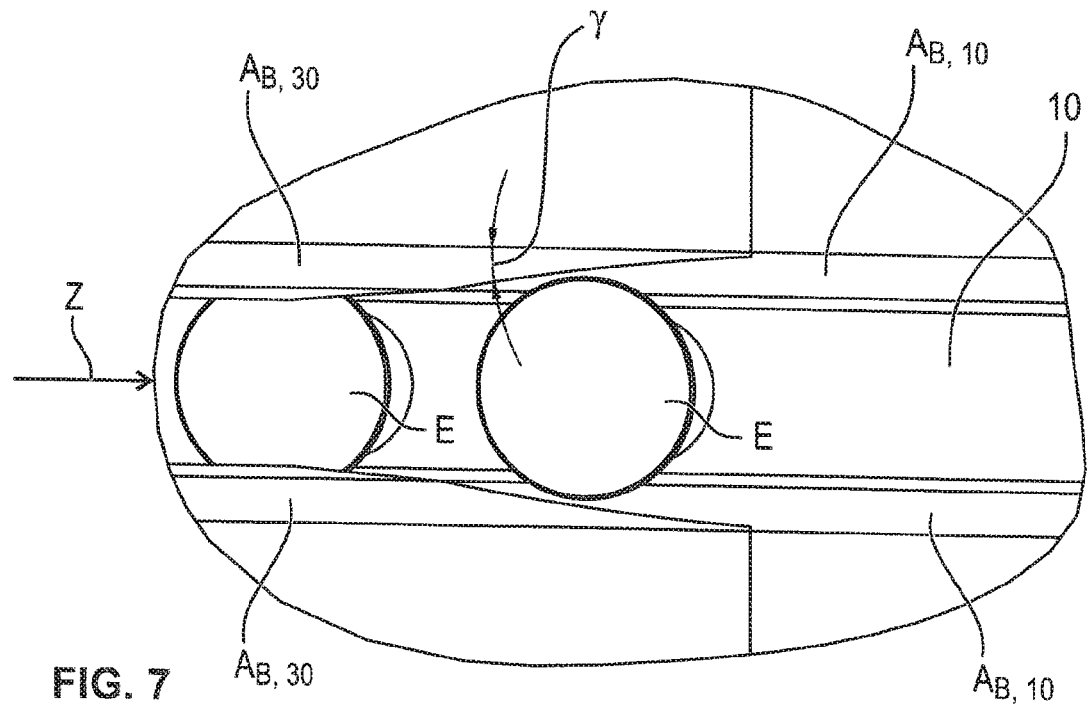
Figure 8:
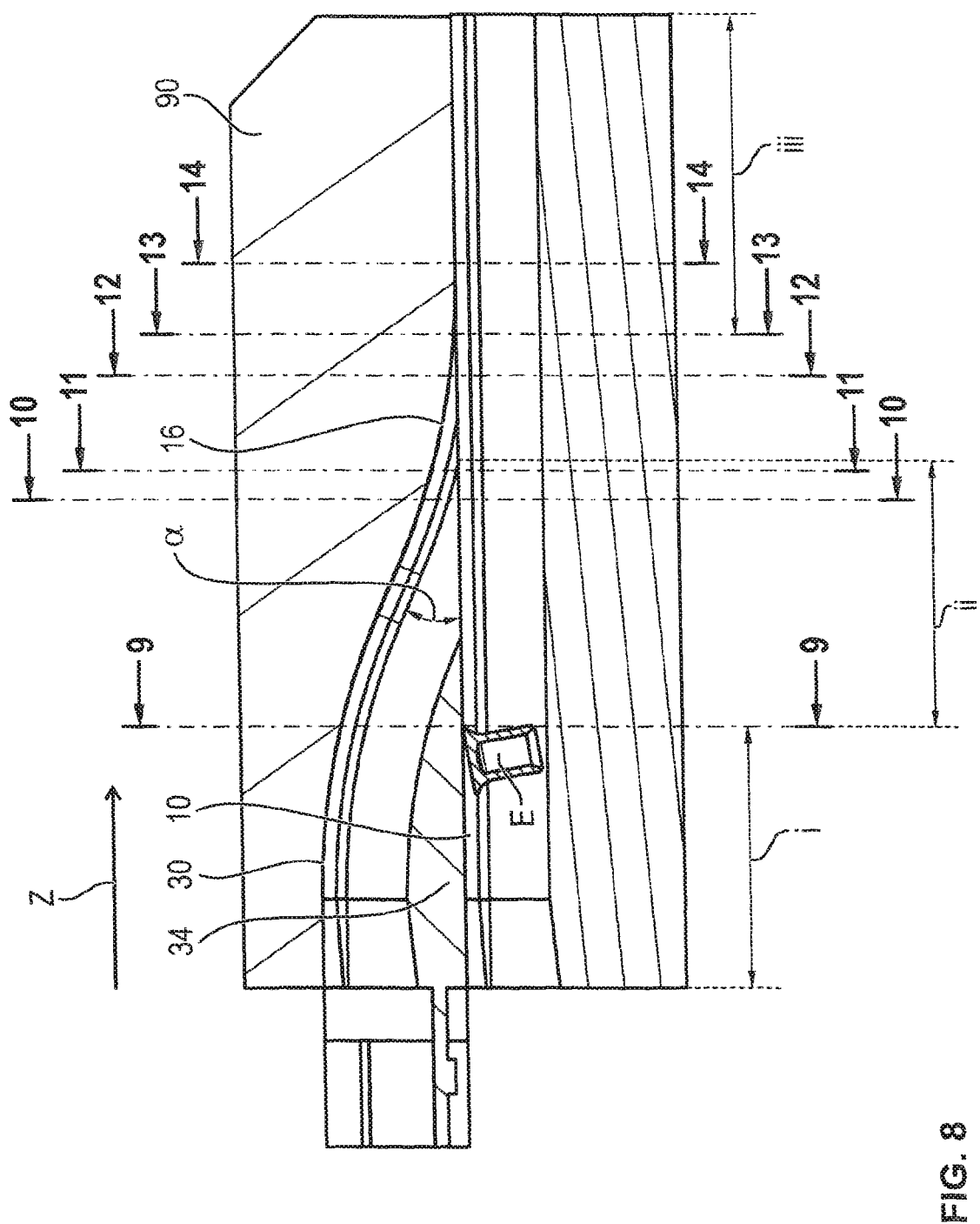
Figure 11A:
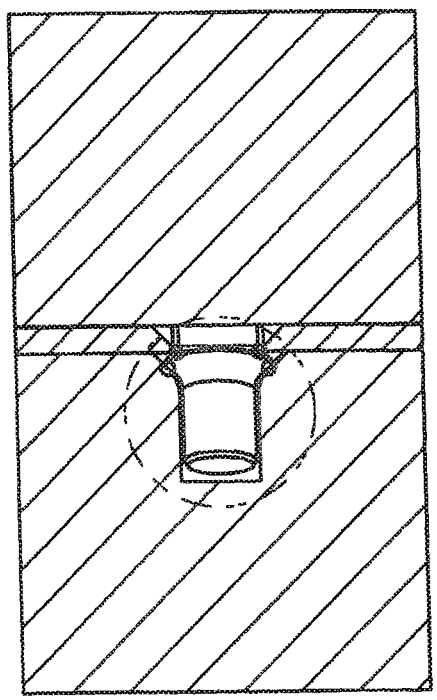
Figure 11B:
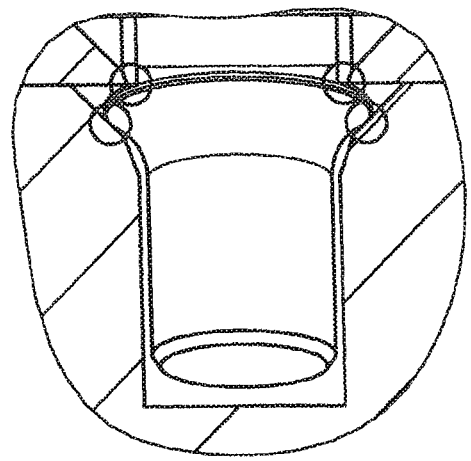
Figure 12A:
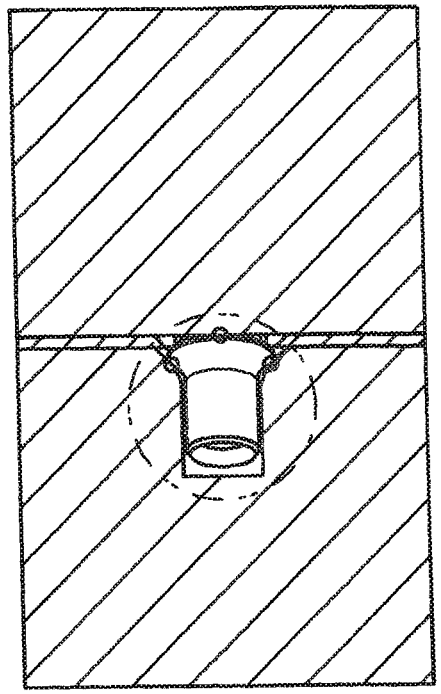
Figure 12B:
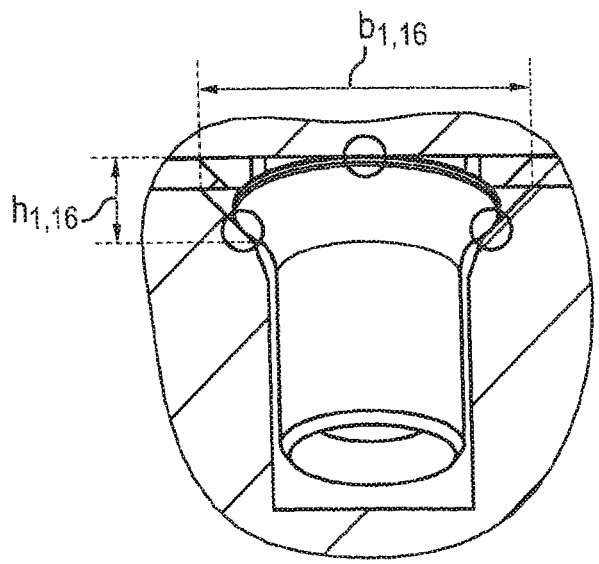
Figure 13A:
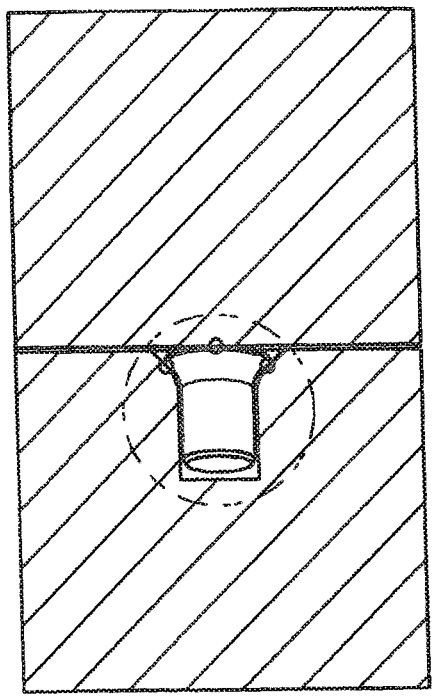
Figure 13B:
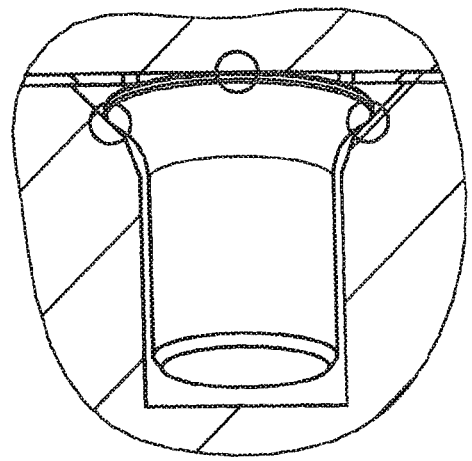
Figure 14A:
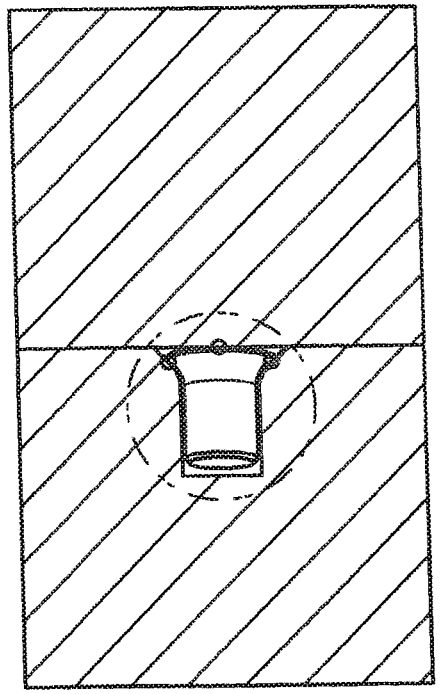
Figure 14B:
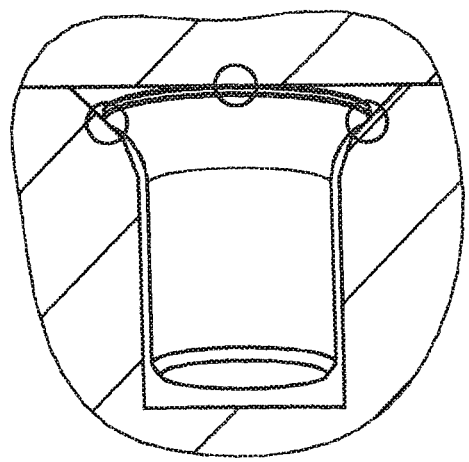
Figure 15:
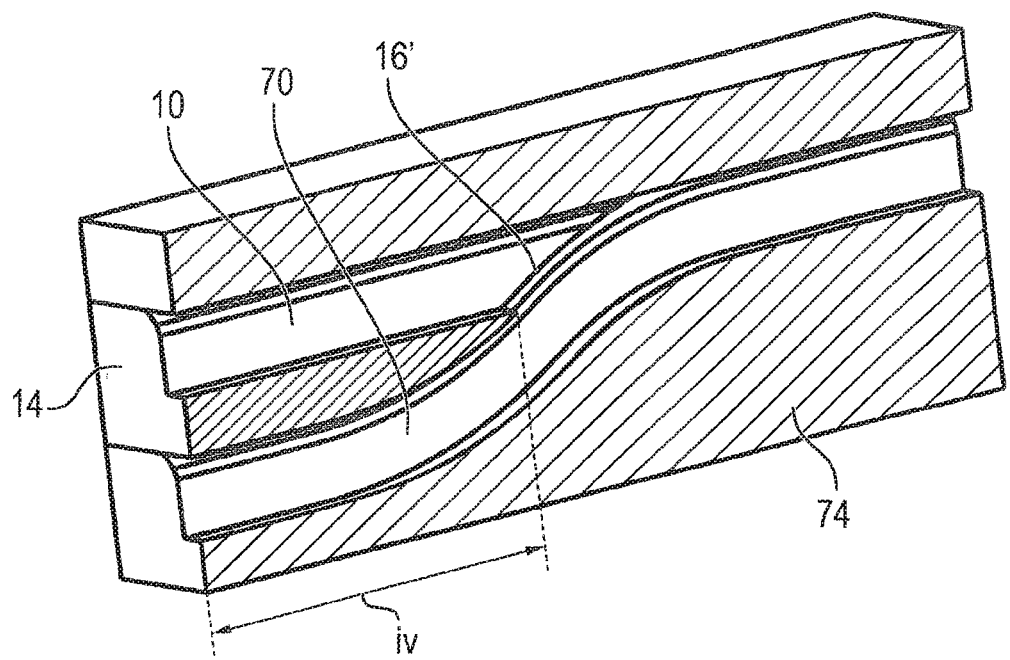
Figure 16:
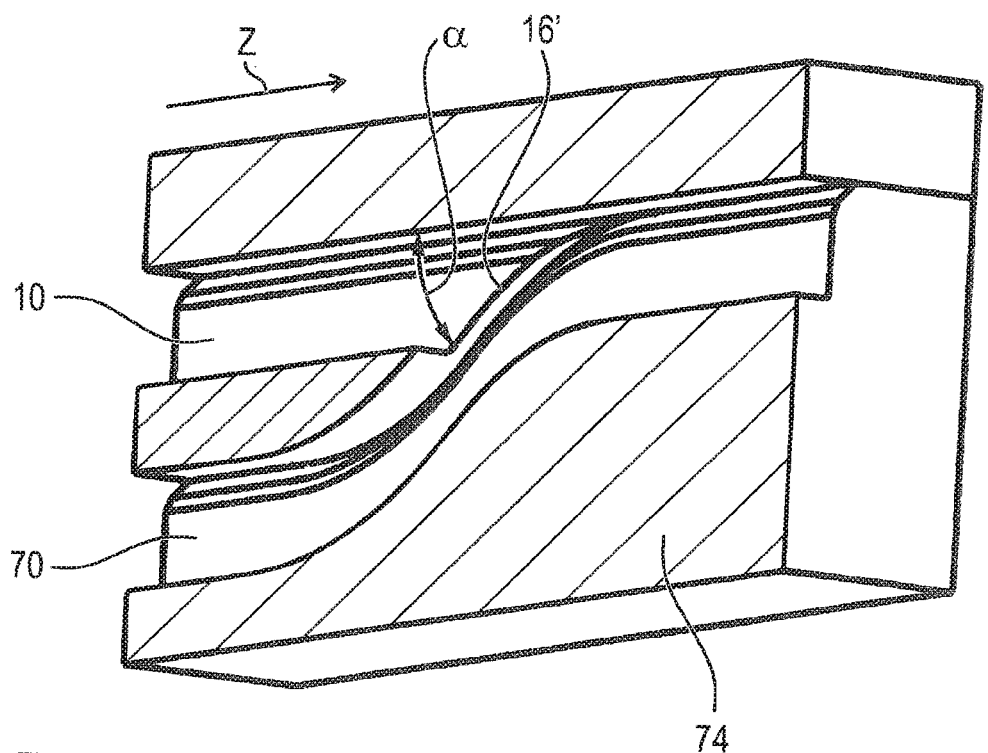
Figure 17:
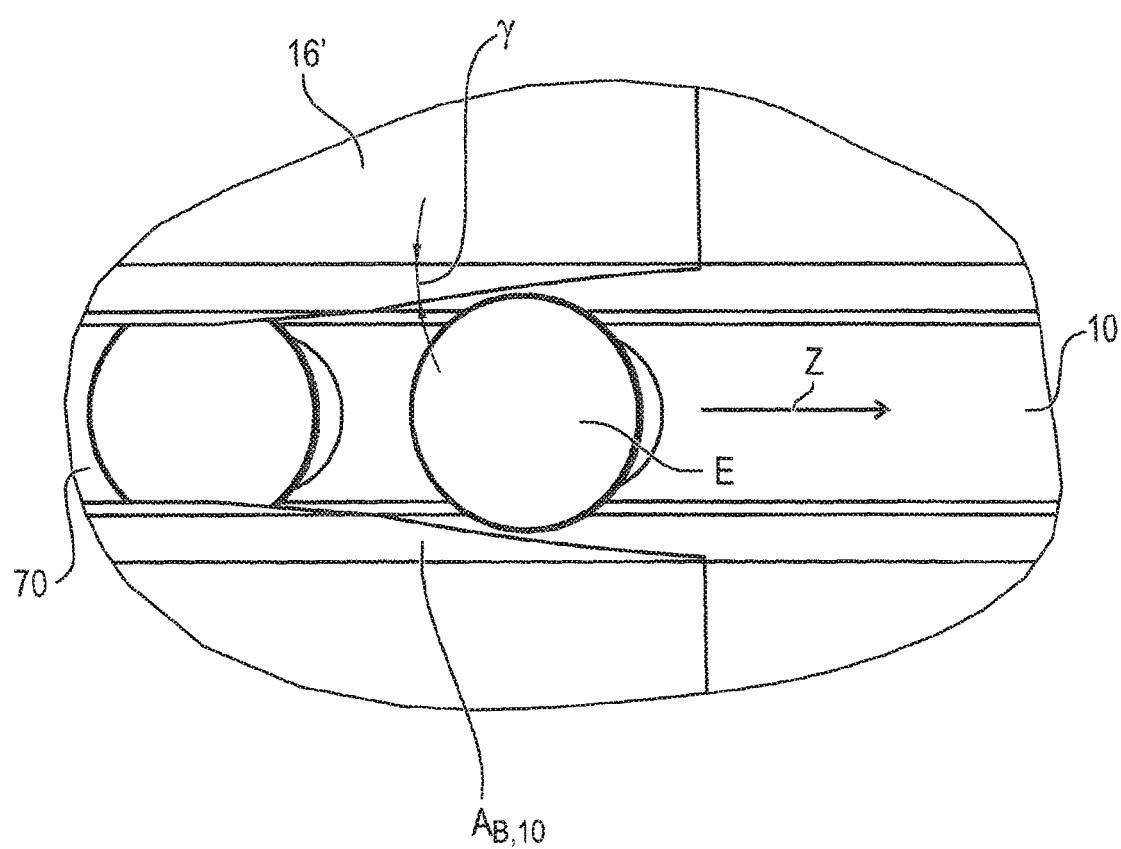
Figure 18:
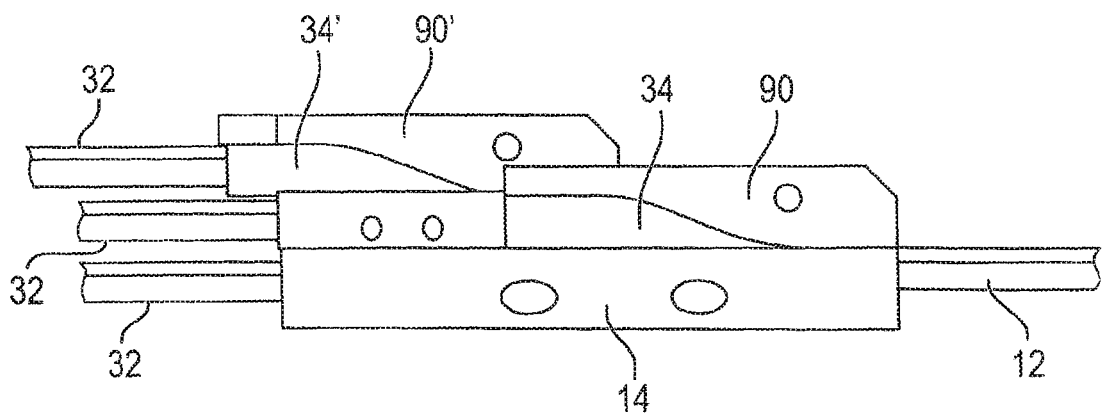
Figure 19:
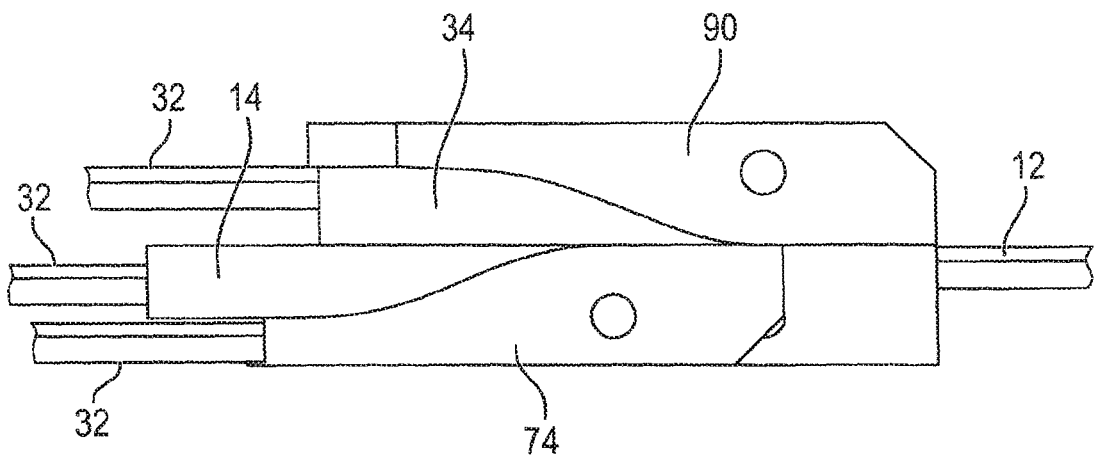
Figure 20:
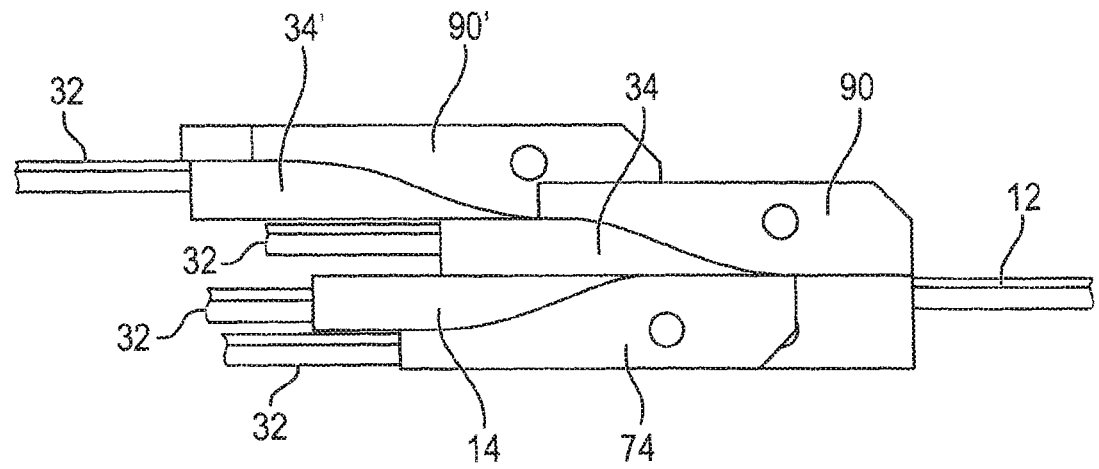
Figure 21:
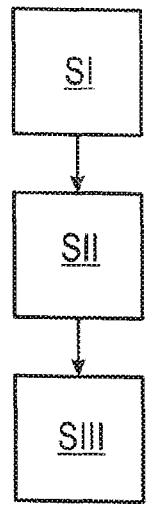
Figure 22:
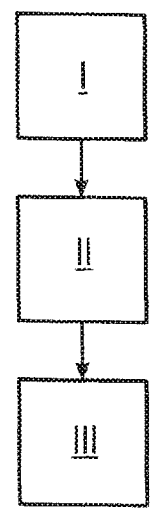
Figure 23:
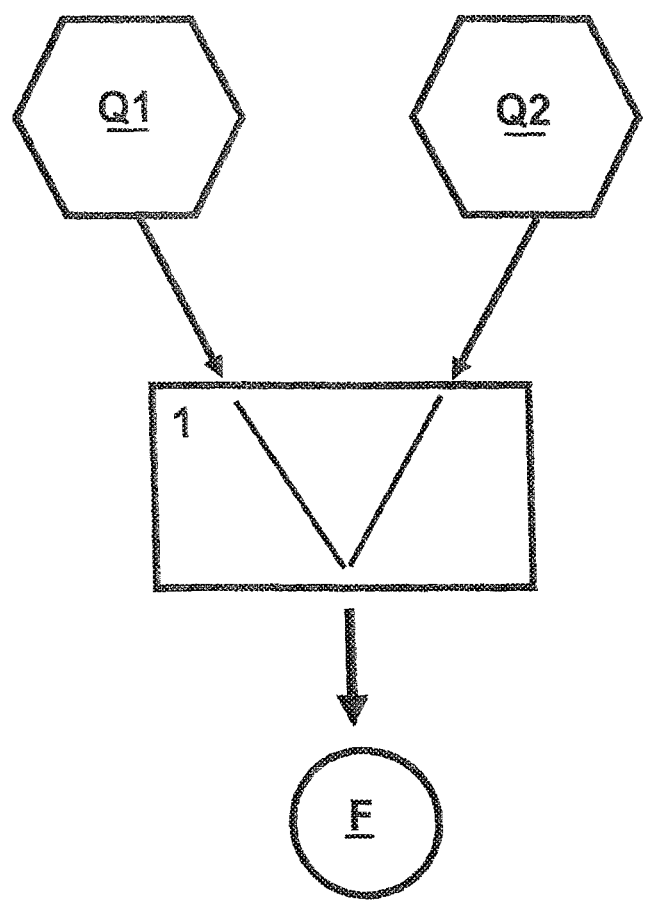

The embodiments of the present disclosure are explained in more detail with reference to the accompanying drawings. It shows:

FIG. 1 is a perspective view of an embodiment of the element switch with a main profiled track and a further profiled track entering the main profiled track on the head side, FIG. 2 is an exploded view of the element switch according to FIG. 1, FIGS. 3a and 3b are schematic representations of cross-sections of main profiled track and profiled track, FIG. 4 is an embodiment of the main profiled track with an indicated profiled track and cover arranged thereover, FIG. 5 is a perspective top view of the profiled track arranged above the main profiled track according to FIG. 3, FIG. 6 is an enlarged representation of the circled portion from FIG. 5, FIG. 7 is an enlarged representation of the transition of the profiled track into the main profiled track according to FIG. 6 with connecting elements, FIG. 8 is a lateral sectional view of an embodiment of the element switch with a connecting element moving through the main profiled track, FIG. 9a is a sectional view along the line 9-9 of FIG. 8, FIG. 9b is an enlarged representation of the element of FIG. 9a, FIG. 10a is a sectional view along the line 10-10 of FIG. 8, FIG. 10b is an enlarged representation of the element of FIG. 10a, FIG. 11a is a sectional view along the line 11-11 of FIG. 8, FIG. 11b is an enlarged representation of the element of FIG. 11a, FIG. 12a is a sectional view along the line 12-12 of FIG. 8, FIG. 12b is an enlarged representation of the element of FIG. 12a, FIG. 13a is a sectional view along line 13-13 of FIG. 8, FIG. 13b is an enlarged representation of the element from FIG. 13a, FIG. 14a is a sectional view along the line 14-14 of FIG. 8, FIG. 14b is an enlarged representation of the element of FIG. 14a, FIG. 15 is a perspective sectional view of another embodiment of the element switch with a profiled track entering the main profiled track on the shaft side, FIG. 16 is an enlarged representation of the element switch according to FIG. 15, FIG. 17 is an enlarged view of the transition of the profiled track into the main profiled track on the shaft side, FIG. 18 is an embodiment of the element switch in stack form, FIG. 19 is another embodiment of the element switch as a further stack, FIG. 20 is another embodiment of the element switch as a stack consisting of a main profiled track and three further profiled tracks, FIG. 21 is a flowchart of an embodiment of the feeding method, FIG. 22 is a flowchart of an embodiment of the manufacturing method, FIG. 23 is a block diagram of a joining tool with different feeding sources for connecting elements in combination with at least one element switch.

5. DETAILED DESCRIPTION

The present disclosure relates to an element switch 1, as shown in a constructionally simple embodiment in FIG. 1. The element switch 1 is of modular construction. Here, a main profiled track 10 forms a basic module with which at least one further profiled track 30 can be combined (see FIG. 2). The main profiled track 10 and the at least one profiled track 30 are supplied with elements E, such as via profiled tubes or generally profiled lines 12, 32. The profiled lines 12, 32 are adapted to the geometry of the elements E, such as connecting elements, joining elements and the like, in the same way as the main profiled track 10 and the at least one profiled track 30. It may be that the main profiled track 10 and the profiled tracks 30 are formed in such a way that the elements E are head-guided in these tracks 10, 30 during their movement.

Within a base 14, the main profiled track 10 is provided. The main profiled track 10 may have a T-shaped cross-section 16, in order to guide elements E with a shaft and a head, which may be self-piercing rivets, bolts, screws and the like therein, in a positive-locking manner. The above mentioned profiled lines 12, 32 may feed the elements E from storage containers, magazines or separators to the element switch 1. The elements E are forwarded to a processing unit via the main profiled track 10 in the element switch 1. A processing unit may be a setting tool, an automatic screwdriver, a bolt-firing tool or bolt gun or the like. It may also be preferred to forward the elements E to a storage unit, a packaging unit, a magazine unit or an element station to prepare the loading of magazines. An exemplary arrangement in the form of a block diagram is shown in FIG. 23. Here, two sources Q1 and Q2 for elements are provided. These may be separators for connecting elements as bulk material. In order to feed the connecting element in a controlled manner to the element switch 1, the feeding from the individual sources Q1 and Q2 can be selectively switched on and off. In this way a collision of elements in the element switch 1 is avoided. Within the element switch 1, the arriving elements are guided into the main profiled track, which is connected to a processing tool, in this case a joining tool F. Of course, the number of sources Q1 and Q2 can be greater.

The main profiled track 10 can be firmly connected to at least one profiled track 30 via a fastening portion 50. The profiled track 30 is provided within a first upper block 34. The first upper block 34 may be fastened to the base 14 in such a way that it closes the main profiled track 10 on one side. Thus the first upper block 34 also has the function of a cover for the main profiled track 10. If the element switch 1 does not use an upper block 34, it also may be preferred to close the main profiled track completely or partially with a cover or a cover block 90.

The profiled track 30 in the upper block 34 is firmly connected to the main profiled track 10. In the same way, it also may be preferred to provide a lower block 74 which also has at least one profiled track 70 which is firmly connected to the main profiled track 10. "Firmly connected" means, with regard to the connection between the main profiled track 10 and the profiled tracks 30, 70, that these tracks are neither movable nor switchable in order to change the path of the elements E. The element switch 1 thus defines a fixed path of the elements E, which can only be changed by a constructive redesign of the element switch 1, in particular a retrofitting. Thus, the element switch 1 cannot be switched and is constructed without mechanically moved switching elements. This ensures low maintenance effort and low susceptance to failure of the element switch 1.

Based on the combination of base 14 with at least one upper block 34 and/or at least one lower block 74, the main profiled track 10 can be modularly combined with at least one, or a plurality of profiled tracks 30, 70. Accordingly, this results in a cascaded element switch 1 in which the elements E from at least one profiled track 30, 70 are brought together with the elements E from the main profiled track 10 in the main profiled track 10.

Due to this cascade-like structure of the element switch 1 and the lack of switchability, the elements E only pass through it in the feeding direction Z. The feeding direction Z extends from an entry portion I of the element switch 1 to an exit portion II of the element switch 1. The entry portion I is characterized by a higher number of profiled tracks 10, 30, 70 than the exit portion II, wherein in this case the main profiled track 10 is generally considered as profiled track.

Within the element switch 1, which is only operated as a one-way element switch 1, and the connected profiled tubes 12, 32, the elements E may be moved in different ways. The movement of the elements E is performed by gravity, mass inertia, compressed air, eddy current, vibration or a combination thereof as well as by other conceivable drive media or means which can move the elements E in a profiled track.

As already described above, the main profiled track 10 is created in the base 14 as a first feeding path for the elements E. Depending on the material of the base 14, which may consist of metal or plastic, may be material-removing methods or injection molding are used to manufacture the base 14 with the main profiled track 10. The same applies to the track constructions described below.

The elements E, which may be connecting elements, are constructed mirror-symmetrically to a longitudinal axis at least in cross-section. Such elements may include screws with an angular or non-circular head circumference, nuts with an angular or non-circular circumferential contour and washers, to mention only a few examples. According to an embodiment, such elements E are formed T-shaped in their cross-section parallel to the longitudinal axis, such as self-piercing rivets or screws. According to another embodiment, they comprise a thickening in the axial cross-section with two webs extending opposite to each other in the axial direction, respectively, similar to a cross-shape, such as a blind rivet screw. In addition, elements E, which may be rotationally symmetric around a longitudinal axis, are fed via the element switch 1, such as self-piercing rivets with or without countersunk head, bolts, nails, blind rivet nuts and the like.

To be able to transport these elements E through the element switch 1, such as by means of compressed air, a cross-section of the main profiled track 10 and of the at least one profiled track 30 has at least one first portion $B_1$ (see FIG. 3a, b). The first portion $B_1$ is mirror-symmetrical to a line S perpendicular to the feeding direction Z as axis of symmetry in relation to the feeding direction Z. In addition, the first portion $B_1$ is characterized in that its height $h_1$ measured parallel to the perpendicular line S is smaller than its width $b_1$ measured perpendicularly to the perpendicular line S. Such a cross-section of the main profiled track 10 and of the profiled tracks 30, 70 within the element switch 1 is suitable for transporting nuts, washers or similarly shaped elements E. The first portion $B_1$ of the cross-section of the profiled tracks 10, 30, 70 provides to this end sufficiently large, lateral up to continuous bearing portions $A_{B1}$. These bearing portions $A_B$ ensure a position-oriented transport of the elements E through the element switch 1. Furthermore, the bearing portions $A_B$ allow a safe transfer of the elements E between the at least one profiled track 30; 70 and the main profiled track 10. This is described in detail below using the example of self-piercing rivets as element E.

It may be preferred that the opposite sides of the first portion $B_1$ may also not extend parallel to each other. In this context, any angular orientation of the sides unequal to 90° or unequal to 0° with respect to the perpendicular line S is also imaginable. Since, regardless of this course of the sides in the cross-sectional shape of the profiled tracks 10; 30; 70, the position orientation of the element E in the profiled track 10; 30; 70 is maintained.

It may be further preferred that the cross-section of the profiled track 10; 30; 70 comprises a second portion $B_2$. The second portion $B_2$ is also arranged mirror-symmetrically to the perpendicular line S. Compared to the first portion $B_1$, the second portion $B_2$ has a smaller width $b_2$. In a similar way as in the first portion $B_1$, the limiting sides of the second portion $B_2$ are aligned parallel, perpendicularly or arbitrary angular to the perpendicular line S. Since the first portion $B_1$ may have a greater width $b_1$ than the second portion $B_2$, reliable bearing portions $A_B$ are also provided even if the sides are arranged in an inclined manner.

The cross-section of the main profiled track 10 and of the profiled tracks 30; 70 may be thus formed T-shaped. A similar T-shaped form can also be seen in the profiled tracks 10; 30; 70 of FIGS. 4 to 15. The T-shaped profiled tracks 10; 30; 70 are used for elements E with head. These include self-piercing rivets, screws, nails, bolts and the like. Since the first portion $B_1$ of the cross-section provides sufficient bearing portions $A_B$ as well as a lateral guiding for the head of the element E, these are also referred to as elements E which are head-guided in element switch 1. Due to this arrangement of the elements E in the main profiled track 10 and the profiled tracks 30; 70, the first portion $B_1$ is also referred to as head portion and the second portion $B_2$ as shaft portion. If, the main profiled track 10 is therefore connected to the profiled track 30 in the connecting portion 16 via the first portion $B_1$, the profiled track 30 may enter the main profiled track 10 on the head side (see below and FIG. 4). If, in addition, the main profiled track 10 may be connected to at least one profiled track 70 in the connecting portion via the second portion $B_2$, the at least one profiled track 70 enters the main profiled track 10 on the shaft side (see below and FIG. 15).

As can be seen from FIGS. 1, 2 and 4, the main profiled track 10 is formed T-shaped in the base 14. While the shaft portion of the main profiled track 10 may be closed, the upper block 34 covers the main profiled track 10 on the head side at least partially in the feeding direction Z. Within the upper block 34 the profiled track 30 is formed, which enters the main profiled track 10 in the connecting portion 16 on the head side.

As can be seen from FIG. 5, the elements E, in this case self-piercing rivets, are head guided within the main profiled track 10. For this purpose, the bottom side of the rivet head may bear on the bearing portions $A_B$. The arrangement of the rivet head in the first portion $B_1$ of the main profiled track 10 and of the rivet shaft in the second portion $B_2$ of the main profiled track 10 ensures the positive locking between the element E and the main profiled track 10. In the gravity-independent operation of the element switch 1, the main profiled track 10 and the profiled track 30; 70 are closed adjacent to the first portion $B_1$ in order to prevent the elements E from falling out. In addition, the head of the element E may abut against the cover of the main profiled track and the profiled track, as highlighted by the abutment and contact points of the FIGS. 9b, 10b, 11b, 12b, 13b and 14b. This abutment of the elements E at the main profiled track and the profiled track both at the top and the bottom side of the head for T-shaped elements E and at the top and bottom side for non T-shaped elements E is also an expression of the head guiding of the elements E during the movement through the element switch 1.

The element switch 1 of FIG. 5 is shown in a lateral illustration of a longitudinal section in FIG. 8. Here a self-piercing rivet E moves in feeding direction Z. Since the self-piercing rivet E, regardless of the positive-locking guiding in the main profiled track 10, has a certain play or clearance in the first portion $B_1$, i.e. in the head portion, the self-piercing rivet E is inclined by the driving compressed air in the main profiled track 10. The covering effect through the upper block 34 or the head guiding (see above) prevents further tilting of the self-piercing rivet E due to the head abutment. The tilting is a result of the application of the driving force, e.g. compressed air, in the center of gravity of the element E and the clearance of the head of the element E in the head guiding. A center of gravity SP of the element E is shown in FIGS. 3a and 3b. In FIG. 3a, the center of gravity SP is arranged in the center of the portion $B_1$. Due to the shaft portion $B_2$ of the T-shaped element E in FIG. 3b, the center of gravity $SP_1$ is shifted in the direction of the portion $B_2$ compared to FIG. 3a. Depending on the size or length of the shaft portion $B_2$ parallel to the axis of symmetry S, the center of gravity SP is arranged differently. If the portion $B'_2$ is formed to be shorter (dashed line in FIG. 3b), the center of gravity $SP_1$ is shifted more in the direction of the portion $B_1$. If the portion $B_2$ is formed to be longer, the center of gravity $SP_2$ is shifted further into the portion $B_2$. This is shown in FIG. 3b by the marked centers of gravity $SP_1$ and $SP_2$. Thus a driving force acting at the center of gravity $SP_2$ has a stronger tilting and levering effect on the element E in the feeding direction than a driving force acting at the center of gravity $SP_1$. The feeding direction Z is indicated by a circle with a central point, respectively. Accordingly, the feeding direction Z runs parallel to the normal of the drawing plane of FIGS. 3a, 3b towards the observer.

The at least one profiled track 30 enters the main profiled track 10 in the connecting portion 16 on the head side. A track path of the profiled track 30 may tangentially transition into the main profiled track 10 in order to achieve a smooth-running and interference-free entry of element E from the profiled track 30 into the main profiled track 10. In doing so, the cover block 90 may cover the profiled track 30 in the same way as a part of the main profiled track 10. With regard to the above-described entering, the same applies analogously to the at least one profiled track 70 described in more detail below, which enters the main profiled track 10 on the shaft side (see FIG. 15).

In FIGS. 9 to 14 the sections are shown according to lines 9-9, 10-10, 11-11, 12-12, 13-13 and 14-14 in FIG. 8. They illustrate the movement of the element E in the feeding direction Z along the main profiled track 10 and through the connecting portion 16. Based on FIG. 9a, it can be seen at first that the axis of symmetry S of the cross-sections of the profiled track 30 and the main profiled track 10 are aligned nearly collinear to each other. A certain deviation in collinearity in the feeding direction Z before the connecting portion 16 is caused by an inclination α of the profiled track 30. With the tangential transition of the profiled track 30 into the main profiled track 10 in the connecting portion 16, collinearity is completely established. Only specific tolerances in the positive locking between the profiled track 30 and the element E still allow an element inclination, so that, here as well, an approximate collinearity can be assumed. It is understood that in addition to the approximate collinearity of the axes of symmetry S, also the cross-sections of the profiled track 30 and of the profiled track 10 must be oriented in the same manner.

The above mentioned angle of inclination or entrance angle α of the profiled track 30 is selected from a range of 5°≤α≤90°. Regardless of the size of the angle α, the profiled track 30 may enter the main profiled track 10 tangentially or at an acute angle from a range of 2° to 45°, or between 2° to 20° and even 2° to 10°. The inclination angle α may be a value from the range of 25°≤α≤60°.

As can be seen from the sectional views of FIGS. 9 to 14 at subsequent positions in the T-shaped main profiled track 10, the element E is guided in a positive-locking manner at several points in the first portion $B_{1,\ 10}$, which is also referred to as the head portion. Even if the first portion $B_{1,\ 10}$ is formed by partially inclined areas, here again a T-shaped cross-section of the main profiled track 10 is present.

At first, the element E moves along a track portion i which is circumferentially completely enclosed. While the shaft of the element E is received in the second portion $B_{2,\ 10}$, the upper block 34 acts as the cover of the main profiled track 10. In this portion, the element E, in particular the head of the self-piercing rivet, is supported at three points in the head guiding of the main profiled track 10. These points are formed by the upper body 34 as cover and the bearing portions $A_{B,\ 10}$. As soon as the profiled track 30 and the main profiled track 10 approach each other in the connecting portion 16 to such an extent that the second portion $B_{2,\ 30}$ of the profiled track 30 establishes a connection to the main profiled track 10, the cover effect of the upper block 34 is discontinued. But since the second portion $B_{2,\ 30}$ of the profiled track 30 approaching the main profiled track 10 tangentially is perpendicularly to the feeding direction Z formed narrower than the first portion $B_{1,\ 10}$ of the main profiled track 10, the cover effect of the upper block 34 is reduced to an edge section of the profiled track 30. Thus the element E is guided, supported and therefore held positionally stable through four abutment points during its movement in the track portion ii.

The first portion $B_1$ of the cross-section of the main profiled track 10 and of the profiled track 30; 70, which is responsible for the head guiding and also generally for the guiding of non-T-shaped elements such as washers, nuts or the like, has the height $h_1$. The height $h_1$ may have a value which fulfils the condition $h_1 < b_1$. Furthermore it may apply that ⅛ $b_1 \le h_1 \le$ ⅔ $b_1$.

Since the width $b_1$, considering a tolerance range, corresponds to the head diameter or outer diameter of the element E, a height $h_1$ adapted to this ensures a maximum tilting of the element E to the perpendicular line S1, whereby no blocking of the profiled track is caused by the element E. This tilting is caused, for example, by the compressed air which moves the element E within the main profiled track 10 or within the profiled tracks 30; 70. However, it does not have a negative effect on the transport of the element E, since the dimensioning of the main profiled track 10 and of the profiled tracks 30; 70 prevents a blocking or jamming of the element E.

With the tangential transition of the profiled track 30 into the main profiled track 10 according to FIGS. 11 and 12, the two upper abutment points at the head of the element E move laterally outwards perpendicular to the feeding direction Z. As soon as the second portion $B_{2,\ 30}$ of the profiled track 30 transitions into the second portion $B_{2,\ 10}$ of the main profiled track 10, the lateral support is lost at two points on the upper side of the head of element E. For this reason, the element E may have a stronger inclination in relation to the perpendicular line S to the guiding direction Z, as can be seen in the comparison of FIGS. 11b and 12b. The inclination of element E is limited by a head-side support of the element E on the side of the first portion $B_{1,\ 30}$ of the profiled track 30 facing away from the shaft. In the connecting portion 16, in which the first portion $B_{1,\ 30}$ of the profiled track 30 transitions into the first portion $B_{1,\ 10}$ of the main profiled track 10, the head of the element E has the most freedom of movement and thus susceptance to failure. This is because in this connecting portion 16 the lateral bearing portions $A_{B,\ 30}$ and thus the support points on the upper side of the head of the element E are displaced laterally outwards until they lose their effect (see FIGS. 6 and 7). In order to avoid an excessive tilting or even jamming of the element E in the main profiled track 10, the connecting portion 16 therefore comprises in its cross-section a first portion $B_{1,\,16}$, the height $h_{1,\,16}$ of which may have a value which fulfils the condition $h_{1,\,16} < b_{1,\,16}$. Furthermore it may apply that $\frac{1}{8}b_{1,\,16} \leq h_{1,\,16} \leq \frac{2}{3}b_{1,\,16}$.

With the further movement of the element E in the feeding direction Z, the height $h_{1,\,16}$ of the connecting portion 16 decreases until it corresponds to the height $h_{1,\,10}$ of the main profiled track 10. At this, the inclination of the element E decreases further in the feeding direction Z, while the element E is supported at three points (see FIGS. 13 and 14).

From FIG. 7 it can be seen that the bearing portions $A_{B,\,30}$ may continuously recede laterally. The discharge angle γ used for this is selected from a range of 5°≤γ≤90° with respect to the feeding direction Z. An angle from the range 45°≤γ≤70° may be used. It may be preferred to use an angle range of 15°≤γ≤40°, assuming that an installation space available for the element switch 1 permits this.

Therefore, it also may be preferred that the bearing portions $A_{B,\,30}$ are set back laterally in a stepped manner. In addition, the bearing portions $A_{B,\,30}$ end laterally in a curvilinear manner. By the lateral receding of the bearing portions $A_{B,\,30}$, the length of the connecting portion 16 in the feeding direction Z may be adjusted.

While the movement of the element E along the main profiled track 10 through the connecting portion 16 has been described by the connecting portion 16, an analogous movement of the element E occurs through the at least one profiled track 30 and the connecting portion 16. In doing so, the element E may be permanently guided, supported and oriented in its position at three points. When the second portion $B_2$ of the profiled track 30 has been broadened by means of the receding bearing portions $A_{B,\,30}$ (see FIG. 7) to such an extent that the element E loses its head guiding in the profiled track 30, the element E transitions in the connecting portion 16 into the main profiled track 10. From this moment on, which is shown in FIG. 12, the further movement of element E is analogous to the movement of the element E in the main profiled track, as described above.

A further embodiment of the element switch 1 is shown in FIGS. 15 to 17. Here, at least one profiled track 70 enters the main profiled track 10 from below, i.e. on the shaft side. The sectional views in FIGS. 15 and 16 show that the profiled track 70 in track section iv at first provides a three-point guiding for the element E. This corresponds to the guiding in track section ii of FIG. 8. As soon as the second portion $B_{2,\,10}$ or shaft portion of the main profiled track 10 connects with the profiled track 70, the cover effect of the base 14 is suspended. In this portion, the three-point guiding of the element E thus transitions to the four-point guiding discussed above. Here, too, the construction is analogous to the construction shown in FIG. 8. Correspondingly, the at least one profiled track 70 may enter the main profiled track 10 via the angle α tangentially.

Before the first portion $B_{1,\,70}$ of the profiled track 70 enters the first portion $B_{1,\,10}$ of the main profiled track 10, the bearing portions $A_{B,\,10}$ are set back as indicated in FIG. 17. For the constructive design of the connecting portion 16' shown here, the same applies as for the connecting portion 16 and its distinctive features (see FIG. 7). As soon as the bearing portions $A_{B,\,10}$ release the element E from the four-point guiding, it switches into a three-point guiding. Here, too, the same analogously applies with regard to the above connection of the main profiled track 10 and the profiled track 30.

As can be seen from the embodiment of FIGS. 18 to 20, the modules described above can be combined with the main profiled track 10 and/or profiled track 30 and/or profiled track 70 in any cascade-like manner. In this way, via each feeding line 32, an element E of a different configuration can be fed. Since the feeding may be clocked, elements E do not collide within the element switch 1. In addition, all feeding lines/paths 32 lead into only one main line 12, which is connected to a magazining unit, a connecting tool, a storage unit or the like.

In this way, it is possible to react to any joining task with a suitable joining element without having to adapt feeding paths each time with a switchable switch.

In the feeding method described here, in step SI, a providing of a plurality of different connecting elements E or generally elements occurs, each of which can be fed to a connecting tool, in particular a setting tool, via a main profiled track 10. Subsequently, the plurality of profiled tracks 30; 70 including at least one main profiled track 10 and at least one profiled track 30; 70 are connected with a non-path-variable element switch 1. In this way it is ensured in step SII that the plurality of different connecting elements E are brought together in a clocked manner in the main profiled track 10. In a final step SIII, the different connecting elements E or elements are fed to the connecting tool in a clocked manner via the non-path-variable element switch 1 in such a way that at least one connecting element reaches the main profiled track on the head or shaft side via a profiled track.

For the manufacturing of the non-path-variable element switch 1, a main profiled track 10 is provided in a first step I. Within this main profiled track 10, the elements E can be guided in a positive-locking manner, which may be head-guided. In a second step II, at least one profiled track 30; 70 is provided. In this profiled track 30; 70, as well, the element E can be guided in a positive-locking manner, which may be head-guided. In a third step III, the main profiled track 10 is connected to at least one profiled track in a connecting portion 16; 16'. The main profiled track comprises a T-shaped cross-section with a head side and a shaft side. In addition, the at least one profiled track 30; 70 opens on the head side or shaft side into the main profiled track.

The invention claimed is:

1. A non-path-variable element switch, which can be passed continuously by elements being positive-lockingly guided, therein only in a feeding direction from a plurality of profiled tracks into a number of profiled tracks which is reduced compared to the plurality of profiled tracks, wherein the element switch fixedly connects a main profiled track to at least one first profiled track, and in which an element to be transported can be guided in a position-oriented manner in a profiled track by positive-locking between element and profiled track, wherein the main profiled track comprises a T-shaped cross-section with a head side and a shaft side and the at least one first profiled track opens in a connecting portion on the head side or shaft side into the main profiled track.

2. The element switch according to claim 1, in which the at least one first profiled track is formed T-shaped in cross-section and comprises a head portion and a shaft portion and the profiled track enters in the connecting portion of the element switch with the shaft portion into the main profiled track on the head side.

3. The element switch according to claim 2, in which the head portion of the at least one first profiled track provides a head bearing being lateral in relation to the feeding direction for an element to be transported, which is set back laterally in the connecting portion.

4. The element switch according to claim 1, in which the at least one first profiled track is formed T-shaped in cross-section and comprises a head portion and a shaft portion and the profiled track enters in the connecting portion with the head portion into the main profiled track on the shaft side.

5. The element switch according to claim 4, in which the main profiled track provides on the head side a head bearing being lateral in relation to the feeding direction which is set back laterally for at least one structure section in the connecting portion when the profiled track opens on the shaft side into the main profiled track.

6. The element switch according to claim 1, in which the main profiled track and the at least one first profiled track are formed closed adjacent to a head portion, wherein the head portion of the main profiled track or of the profiled track is open only in a connecting portion.

7. The element switch according to claim 1, which is connected to a source of compressed air, so that elements can be moved through the element switch by means of compressed air.

8. The element switch according to claim 1, which represents a stacked construction consisting of one main profiled track and several profiled tracks.

9. A feeding method for positive-lockingly guided connecting elements, which comprises the following steps:
   a. providing a plurality of different connecting elements which can each be fed via a main profiled track to a connecting tool,
   b. connecting the plurality of profiled tracks to a non-path-variable element switch, so that the plurality of different connecting elements are brought together in the main profiled track, and
   c. clocked feeding of the different connecting elements via the non-path-variable element switch to the connecting tool in such a way that at least one connecting element gets on the head side or shaft side into the main profiled track via a profiled track.

10. A manufacturing method for a non-path-variable element switch according to claim 1 comprising the following steps:
    a. providing a main profiled track in which an element can be positive-lockingly guided,
    b. providing at least one profiled track in which the element can be positively guided,
    c. firmly connecting the main profiled track to the at least one profiled track in a connecting portion, wherein the main profiled track comprises a T-shaped cross-section with a head side and a shaft side and the at least one profiled track opens into the main profiled track on the head side or shaft side.

11. The manufacturing method according to claim 10, in which a lateral head bearing of the main profiled track which is present with respect to a feeding direction is set back laterally when a profiled track is connected to the main profiled track on the shaft side.

12. The manufacturing method according to claim 10, in which a lateral head bearing of the profiled track which is present with respect to a feeding direction is set back laterally when the profiled track is connected to the main profiled track on the head side.

13. A processing tool for elements, in connection with a plurality of feeding sources for different elements, wherein the elements of the feeding sources can be fed to the processing tool via at least one profiled track and a main profiled track by a non-path-variable element switch which can be passed continuously by elements being positive-lockingly guided therein only in a feeding direction from a plurality of profiled tracks into a number of profiled tracks which is reduced compared to the plurality of profiled tracks, wherein the element switch fixedly connects a main profiled track to at least one first profiled track, and in which an element to be transported can be guided in a position-oriented manner in a profiled track by positive-locking between element and profiled track, wherein the main profiled track comprises a T-shaped cross-section with a head side and a shaft side and the at least one first profiled track opens in a connecting portion on the head side or shaft side into the main profiled track.

\* \* \* \* \*